(12) United States Patent
Nerurkar et al.

(10) Patent No.: US 10,937,214 B2
(45) Date of Patent: Mar. 2, 2021

(54) SYSTEM AND METHOD FOR MERGING MAPS

(71) Applicant: GOOGLE LLC, Mountain View, CA (US)

(72) Inventors: Esha Nerurkar, Mountain View, CA (US); Simon Lynen, Mountainview, CA (US); Dongfang Zheng, Mountainview, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/466,494

(22) Filed: Mar. 22, 2017

(65) Prior Publication Data
US 2018/0276863 A1 Sep. 27, 2018

(51) Int. Cl.
*G06T 11/60* (2006.01)
*G06T 3/00* (2006.01)
*G06T 7/33* (2017.01)
*G01C 21/32* (2006.01)
*G06F 16/29* (2019.01)

(52) U.S. Cl.
CPC .............. *G06T 11/60* (2013.01); *G01C 21/32* (2013.01); *G06F 16/29* (2019.01); *G06T 3/0068* (2013.01); *G06T 7/337* (2017.01); *G06T 2207/20221* (2013.01)

(58) Field of Classification Search
None
See application file for complete search history.

(56) References Cited

U.S. PATENT DOCUMENTS

| | | | | |
|---|---|---|---|---|
| 2013/0328879 | A1* | 12/2013 | Carbonneau | G01C 21/32 345/440 |
| 2014/0267234 | A1* | 9/2014 | Hook | H04W 4/02 345/419 |
| 2014/0292746 | A1* | 10/2014 | Acharya | G11B 27/10 345/419 |
| 2015/0019121 | A1 | 1/2015 | Gao et al. | |
| 2016/0195400 | A1 | 7/2016 | Young et al. | |
| 2016/0335497 | A1 | 11/2016 | Williams et al. | |

(Continued)

OTHER PUBLICATIONS

International Search Report and Written Opinion of the International Searching Authority for PCT Application No. PCT/US2017/058725, 15 pages.

(Continued)

*Primary Examiner* — Peter Hoang

(57) ABSTRACT

An electronic device merges a plurality of maps, or area description files (ADFs), by representing relationships among ADFs in an undirected graph, with vertices representing maps and edges representing transformations between maps. As the electronic device generates new ADFs, the electronic device merges each new ADF to a stored collection of ADFs by adding each new ADF as a vertex and transformations between the new ADF and the collection of ADFs as edges in the undirected graph. In this way, the map merger can use the undirected graph to more accurately represent the relations between any two maps, allowing more efficient merger of new maps to a previously stored collection of maps, and allowing for the development of more flexible and efficient algorithms for manipulating the merged maps.

20 Claims, 6 Drawing Sheets

(56) References Cited

U.S. PATENT DOCUMENTS

2016/0371394 A1* 12/2016 Shahidi ............ G06F 17/30958

OTHER PUBLICATIONS

Written Opinion of the International Preliminary Examining Authority dated Dec. 10, 0218 for corresponding International Application No. PCT/US2017/058725, 8 pages.
International Preliminary Report on Patentability dated Oct. 2, 2019 for corresponding International Application No. PCT/US2017/058725, 10 pages.

* cited by examiner

SYSTEM AND METHOD FOR MERGING MAPS

FIELD OF THE DISCLOSURE

The present disclosure relates generally to imagery capture and processing and more particularly to machine vision using captured imagery.

BACKGROUND

Machine vision and display techniques, such as simultaneous localization and mapping (SLAM), visual inertial odometry (VIO), area learning applications, augmented reality (AR), and virtual reality (VR), often rely on the identification of objects within the local environment of a device through the analysis of imagery of the local environment captured by the device. To support these techniques, the device frequently must merge maps, also referred to as area description files (ADFs), originating from varied sources, such as previously-stored maps, newly-received maps, maps received after a user-initiated mapping session restart, and maps received after a SLAM reset. However, conventional techniques for merging maps typically take a relatively significant amount of time and resources and accumulate errors, thereby limiting the utility and effectiveness of the machine vision techniques.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
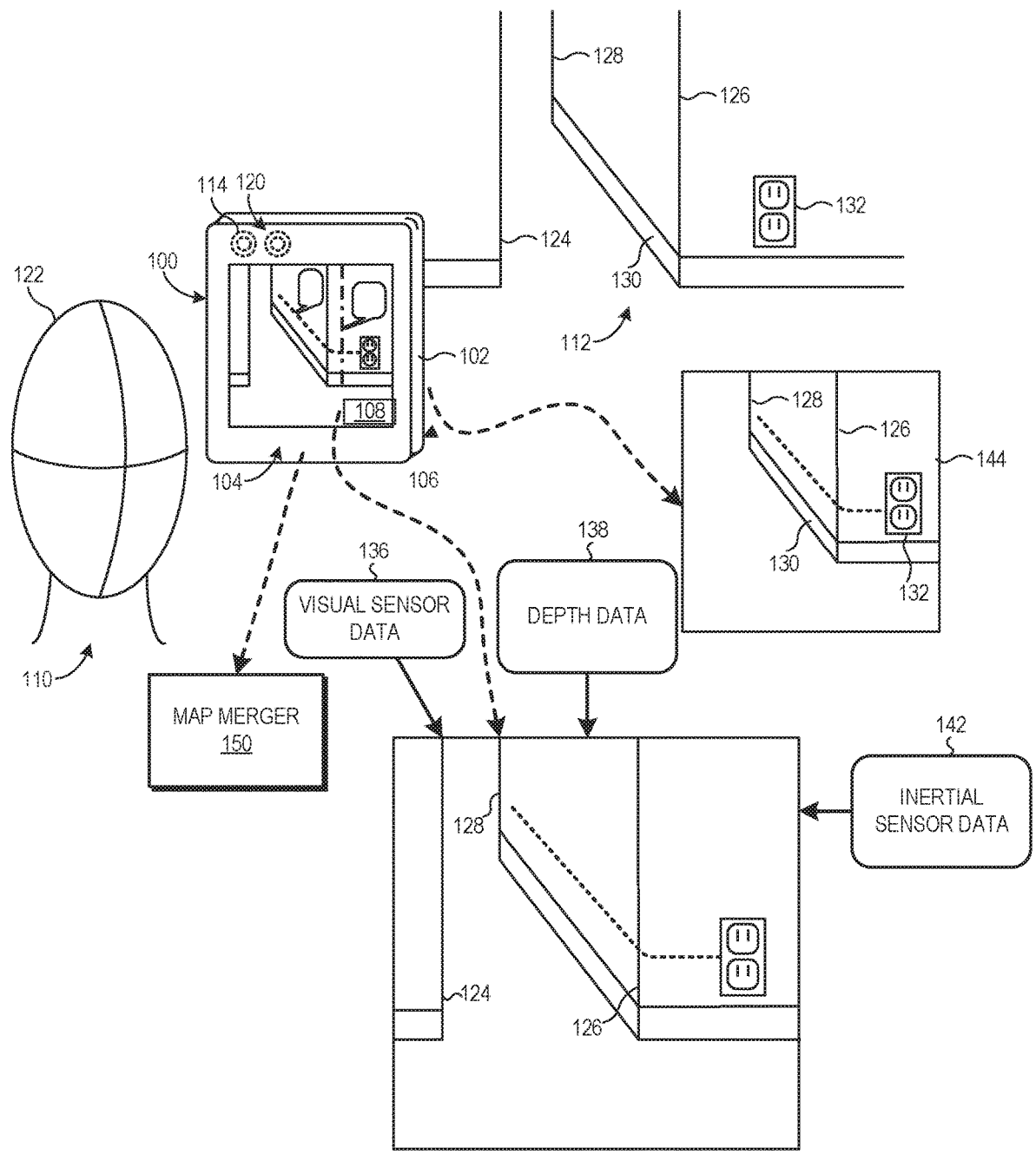
FIG. 1 is a diagram illustrating an electronic device configured to store a plurality of ADFs and to receive ADFs from visual, inertial, and depth sensors to be merged with the plurality of stored ADFs to support an AR/VR experience in accordance with at least one embodiment of the present disclosure.

The following description is intended to convey a thorough understanding of the present disclosure by providing a number of specific embodiments and details involving the merging of an ADF comprising feature descriptors based on measurements by image and inertial sensors to a stored collection of ADFs representing an environment of an electronic device. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-6 illustrate various techniques for the merging of an ADF with a stored collection of ADFs of a local environment by representing the ADFs as vertices and transformations between the ADFs as edges in an undirected graph. The merged ADFs can be used to support location-based functionality, such as area learning, augmented reality (AR) functionality, virtual reality (VR) functionality, visual localization/odometry or other simultaneous localization and mapping (SLAM) functionality, and the like. In some embodiments, the electronic device includes one or more imaging sensors (e.g., imaging cameras) and includes one or more non-image sensors, such as an inertial measurement unit (IMU), that can provide information indicative of the pose and scene (e.g., local environment) of the electronic device. The term "pose" is used herein to refer to either or both of position (also referred to as a location) and orientation (also referred to as a point of view). The pose and scene information (collectively referred to as "scene information") is stored by the electronic device or remotely as a plurality of ADFs. Each ADF of the plurality contains descriptions of visual landmarks based on one or more of imaging sensors, non-image sensors, and AR/VR software scene data. Thus, each ADF includes a set of spatial features detected by an electronic device, the relative geometry of the spatial features, various statistical metadata regarding the spatial features that describe the spatial features in ways substantially independent of the mobile device's pose, the lighting conditions, or other temporary environmental conditions or device-specific conditions, as well as sensor data collected from an inertial management unit (IMU) or other non-image sensors at the time of capture of the imagery associated with the spatial features, collectively referred to as "descriptors" or "feature descriptors" of an ADF.

To create a more realistic and immersive AR/VR experience, the electronic device employs a map merger to merge two or more ADFs to accumulate the data from multiple ADFs sharing common landmarks and common descriptors. Conventionally, as a map merger adds each new ADF to a collection of ADFs, the map merger searches each descriptor of each ADF to determine any matching descriptors between ADFs. The map merger uses the matched descriptors to align the ADFs, such as by applying a loop-closure algorithm. Thus, the map merger can use matched descriptors to estimate a transformation for one or more of the ADFs, whereby the map merger transforms geometric data associated with one of the ADFs having a matching descriptor to be aligned with geometric data associated with another ADF having a corresponding matching descriptor. When the map merger finds a sufficient number of matching descriptors from two ADFs to confirm that the ADFs contain descriptions of common visual landmarks, the map merger performs a transformation between the two ADFs, aligning the geometric data of the two ADFs. Thereafter, the map merger can apply a co-optimization algorithm to refine the alignment of the pose and scene of the ADFs having matching descriptors.

However, searching a collection of ADFs for shared descriptors, performing a transformation, and applying a co-optimization algorithm to the collection of ADFs as each ADF is added to the collection consumes a relatively significant amount of resources and can also accumulate errors, particularly if existing transformations between ADFs are maintained when computing the merger of a new ADF. In addition, conventional merging techniques store subsets of ADFs separately from a main cluster of merged ADFs and therefore may fail to recognize matching descriptors between maps in the unmerged subset, with the result that the main cluster fails to fully represent the relations between ADFs. Accordingly, to achieve a more efficient and accurate merger of ADFs, the map merger represents relationships among ADFs in an undirected graph, with vertices representing maps and edges representing transformations between maps. In this way, the map merger can use the undirected graph to more accurately represent the relations between any two maps, allowing more efficient merger of new maps to a previously stored collection of maps, and allowing for the development of more flexible and efficient algorithms for manipulating the merged maps.

To illustrate, in at least one embodiment the map merger of a head mounted display (HMD) stores a plurality of ADFs as vertices in an undirected graph. The map merger computes transformations from descriptors shared between ADFs, and stores the transformations as edges connecting the vertices of the ADFs having shared descriptors. As a new ADF is received by the map merger, the map merger merges the new ADF to the stored plurality of ADFs by representing the new ADF as a vertex and determining whether a transformation can be computed between the new ADF and at least one of the stored ADFs based on shared descriptors between the new ADF and at least one of the stored ADFs. If a transformation can be computed, the map merger merges the new ADF to the stored plurality of ADFs by representing the transformation between the new ADF and at least one of the stored ADFs as an edge in the undirected graph. In some embodiments, a simultaneous localization and mapping (SLAM) module of the map merger computes a transformation between the new ADF and one of the stored ADFs as the new ADF is generated. The map merger refines the transformations computed between ADFs by solving a co-optimization algorithm that includes only those ADFs that share direct transformations with the new ADF (i.e., the new ADF's neighbors) and those ADFs that can be connected with the neighbors of the new ADF. By representing the ADFs as vertices and the transformations between ADFs as edges in the undirected graph, and including only the new ADF, the new ADF's neighbors, and those ADFs that can be connected with the neighbors of the new ADF, the map merger can merge new ADFs to the plurality of ADFs more efficiently, and the map merger can solve a more focused co-optimization problem, thus more accurately estimating transformations between new and previous ADFs.

FIG. 1 illustrates an electronic device 100 configured to support location-based functionality, such as area learning, SLAM, VR, or AR, using image and non-image sensor data in accordance with at least one embodiment of the present disclosure. The electronic device 100 can include a user-portable mobile device, such as a tablet computer, computing-enabled cellular phone (e.g., a "smartphone"), a notebook computer, a personal digital assistant (PDA), a gaming system remote, a head-mounted device, a television remote, and the like. In other embodiments, the electronic device 100 can include another type of mobile device, such as an automobile, robot, remote-controlled drone or other airborne device, and the like. For ease of illustration, the electronic device 100 is generally described herein in the example context of a mobile device, such as a tablet computer or a smartphone; however, the electronic device 100 is not limited to these example implementations.

In the depicted example, the electronic device 100 includes a housing 102 having a surface 104 opposite another surface 106. In the example thin rectangular block form-factor depicted, the surfaces 104 and 106 are substantially parallel and the housing 102 further includes four side surfaces (top, bottom, left, and right) between the surface 104 and surface 106. The housing 102 may be implemented in many other form factors, and the surfaces 104 and 106 may have a non-parallel orientation. For the illustrated tablet implementation, the electronic device 100 includes a display 108 disposed at the surface 106 for presenting visual information to a user 110. Accordingly, for ease of reference, the surface 106 is referred to herein as the "forward-facing" surface and the surface 104 is referred to herein as the "user-facing" surface as a reflection of this example orientation of the electronic device 100 relative to the user 110, although the orientation of these surfaces is not limited by these relational designations.

The electronic device 100 includes a plurality of sensors to obtain information regarding a local environment 112 of the electronic device 100. The electronic device 100 obtains visual information (imagery) for the local environment 112 via imaging camera 114 and a depth sensor 120 disposed at the forward-facing surface 106. In one embodiment, the imaging camera 114 is implemented as a wide-angle imaging camera having a fish-eye lens or other wide-angle lens to provide a wider-angle view of the local environment 112 facing the surface 106. In some embodiments, the imaging camera 114 is implemented as a narrow-angle imaging camera having a typical angle of view lens to provide a narrower angle view of the local environment 112 facing the surface 106. In some embodiments, both a wide-angle imaging camera and a narrow-angle imaging camera are disposed at the forward-facing surface 106. In some embodiments, an additional user-facing camera (not shown) is disposed at the user-facing surface 104.

The depth sensor 120, in one embodiment, uses a modulated light projector (not shown) to project modulated light patterns from the forward-facing surface 106 into the local environment, and the imaging camera 114 to capture reflections of the modulated light patterns as they reflect back from objects in the local environment 112. These modulated light patterns can be either spatially-modulated light patterns or temporally-modulated light patterns. The captured reflections of the modulated light patterns are referred to herein as "depth imagery." The depth sensor 120 then may calculate the depths of the objects, that is, the distances of the objects from the electronic device 100, based on the analysis of the depth imagery. The resulting depth data obtained from the depth sensor 120 may be used to calibrate or otherwise augment depth information obtained from image analysis of the image data captured by the imaging camera 114. Alternatively, the depth data from the depth sensor 120 may be used in place of depth information obtained from image analysis.

The electronic device 100 also may rely on non-image pose and scene information for pose and scene detection. This non-image pose and scene information can be obtained by the electronic device 100 via one or more non-image sensors (not shown in FIG. 1), such as an IMU including one or more gyroscopes, magnetometers, and accelerometers. In at least one embodiment, the IMU can be employed to generate pose and scene information along multiple axes of motion, including translational axes, expressed as X, Y, and Z axes of a frame of reference for the electronic device 100, and rotational axes, expressed as roll, pitch, and yaw axes of the frame of reference for the electronic device 100. The non-image sensors can also include ambient light sensors and location sensors, such as GPS sensors, or other sensors that can be used to identify a location of the electronic device 100, such as one or more wireless radios, cellular radios, and the like. The non-image sensors also can include user interface components, such as a keypad (e.g., touchscreen or keyboard), microphone, mouse, and the like.

To facilitate the merger of generated ADFs to a collection of stored ADFs, the electronic device 100 includes a map merger 150. The map merger 150 is configured to compare a generated ADF to stored ADFs, compute transformations among previously generated ADFs and between newly generated ADFs and previously generated ADFs, represent ADFs as vertices and transformations between ADFs as edges in the undirected graph, and solve a co-optimization problem to optimize transformations between ADFs so that accurate transformations between newly generated and previous ADFs can be estimated efficiently.

In operation, the electronic device 100 uses the image sensor data and the non-image sensor data to estimate a pose of the electronic device 100 and construct a scene of the local environment 112 of the electronic device 100. In at least one embodiment, after a reset the electronic device 100 determines an initial pose and scene based on geolocation data, other non-visual sensor data, visual sensor data as described further below, or a combination thereof. As the pose of the electronic device 100 changes, the non-visual sensors generate non-visual pose information reflecting the changes in the device pose and scene. Concurrently, the visual sensors capture images that also reflect device pose and scene changes. Based on this non-visual and visual pose information, the electronic device 100 updates the initial pose and scene to reflect a current pose and scene of the device.

The electronic device 100 generates visual pose and scene information based on the detection of spatial features in image data captured by the imaging camera 114. To illustrate, in the depicted example of FIG. 1 the local environment 112 includes a hallway of an office building that includes three corners 124, 126, and 128, a baseboard 130, and an electrical outlet 132. The user 110 has positioned and oriented the electronic device 100 so that the forward-facing imaging camera 114 captures image data 136 that includes these spatial features of the hallway. In this example, the depth sensor 120 also captures depth data 138 that reflects the relative distances of these spatial features relative to the current pose of the electronic device 100. Non-image sensor data 142, such as readings from the IMU, also is collected by the electronic device 100 in its current pose.

From this input data, the electronic device 100 can determine an estimate of its relative pose without explicit absolute localization information from an external source. To illustrate, the electronic device 100 can perform analysis of camera image data 136 to determine the distances between the electronic device 100 and the corners 124, 126, 128. Alternatively, the depth data 138 obtained from the depth sensor 120 can be used to determine the distances of the spatial features. From these distances the electronic device 100 can triangulate or otherwise infer its relative position in the office represented by the local environment 112.

As another example, the electronic device 100 can identify spatial features present in one set of captured images of the image data 136, determine the initial distances to these spatial features, and then track the changes in position and distances of these spatial features in subsequent captured imagery to determine the change in pose and/or scene of the electronic device 100 in a free frame of reference. In this approach, certain non-image sensor data, such as gyroscopic data or accelerometer data, can be used to correlate spatial features observed in one image with spatial features observed in a subsequent image.

The electronic device 100 generates feature descriptors, also referred to as "descriptors", for the spatial features identified in the captured imagery. Each of the generated descriptors describes the orientation, gravity direction, scale, and other aspects of one or more of the identified spatial features. The generated descriptors are stored as an ADF at the electronic device 100. The electronic device 100 also stores previously generated ADFs, which may have been generated in previous sessions or prior to a reset of the visual and inertial sensors, or downloaded from an application. Each previously stored ADF includes a set of stored descriptors (referred to for purposes of description as "known descriptors") that each identifies previously identified spatial features and their corresponding poses. For example, a previously stored ADF containing feature descriptors corresponding to the local environment 112 includes descriptors corresponding to previously identified spatial features 140. In the example depicted in FIG. 1, the previously identified spatial features 140 of the previously stored ADF include a hallway of an office building that includes two corners 126 and 128, a baseboard 130, and an electrical outlet 132. In at least one embodiment, each of the known descriptors is a descriptor that has previously been generated, and its pose definitively established, by either the electronic device 100 or another electronic device. The previously generated ADFs are stored at the electronic device 100, at a remote server or other storage device, or a combination thereof.

In at least one embodiment a generated ADF is compared to a previously stored ADF by comparing each descriptor of the generated ADF (e.g., the orientation of a corresponding feature, the scale of the corresponding feature, and the like) to the corresponding descriptor of the stored ADF and determining an error value indicating the variance between the compared descriptors. Thus, for example, if the orientation of a feature in the generated ADF is identified by a vector A, and the orientation of the feature in the stored ADF is identified by a vector B, the electronic device 100 can identify an error value for the orientation aspect of the feature descriptors by calculating the difference between the vectors A and B. The error values can be combined according to a specified statistical technique, such as a least squares technique, to identify a combined error value for each known feature descriptor being compared, and the matching known feature descriptor identifies as the known feature descriptor having the smallest combined error value.

Each of the known feature descriptors includes one or more fields identifying the pose (e.g., the orientation or point of view) of the corresponding spatial feature. Thus, a known feature descriptor can include pose information indicating the location of the spatial feature within a specified coordinate system (e.g., a geographic coordinate system representing Earth) within a specified resolution (e.g., 1 cm), the orientation of the point of view of the spatial feature, the distance of the point of view from the feature and the like. The generated feature descriptors are compared to the known feature descriptors to identify one or more matched known feature descriptors. The matched known feature descriptors are then used to identify a pose of the electronic device 100.

In at least one embodiment, the generated feature descriptors are not compared to all available known feature descriptors, but instead to a subset of the available known feature descriptors identified based on the estimated pose of the electronic device 100. For example, the subset of known feature descriptors can be identified as those within a specified distance of the pose of one of the generated feature descriptors. This limits the number of known feature descriptors for matching, thereby speeding up the matching process.

To facilitate the merging of ADFs having matching descriptors, the map merger 150 compares the descriptors of the stored ADFs to determine if there are sufficient matching descriptors to compute a transformation between ADFs. If there are sufficient matching descriptors between any two ADFs to compute a transformation aligning the two ADFs, the map merger 150 computes a transformation aligning the two ADFs. The map merger 150 represents each of the ADFs for which a transformation has been computed as a vertex (not shown) in an undirected graph (not shown), and represents the transformation between the ADFs as an edge connecting the two vertices representing the ADFs. The matching of descriptors and representation of vertices and edges in the undirected graph is repeated for each of the stored ADFs. The comparison of the generated descriptors can be performed by the map merger 150 at the electronic device 100, at the remote server or other device, or a combination thereof.

As a user 110 traverses a local environment 112 with the electronic device 100 collecting visual and inertial sensor data to generate an ADF, the electronic device 100 determines whether a visual and inertial sensor transformation connecting the generated ADF to a stored ADF exists. If a visual and inertial sensor transformation connecting the generated ADF to a stored ADF exists, the map merger 150 adds the generated ADF as a vertex in the undirected graph and adds the transformation connecting the generated ADF to the stored ADF. If a visual and inertial sensor transformation connecting the generated ADF to a stored ADF does not exist, the map merger 150 compares the descriptors of the generated ADF to the descriptors of the stored ADFs to determine whether there are sufficient matching descriptors to compute a transformation aligning the generated ADF to at least one of the stored ADFs. If there are sufficient matching descriptors, the map merger 150 computes the transformation and adds the generated ADF as a vertex to the undirected graph and adds the transformation as an edge connecting the vertex of the generated ADF to the stored ADF with which it is aligned.

Once the generated and stored ADFs have been merged by adding the generated ADF as a vertex to the undirected graph and the transformation(s) between the generated ADF and stored ADF(s) have been added as edges to the undirected graph, the map merger 150 refines, or optimizes, the transformation(s) between the generated ADF and those ADFs with which it shared transformations, by solving a co-optimization algorithm problem that includes only the generated ADF, those stored ADFs with which the generated shares transformations (the generated ADF's "neighbors"), and those stored ADFs which share transformations with the generated ADF's neighbors. The co-optimization problem may be solved by a Gauss-Newton or Levenberg-Marquardt algorithm, or another known algorithm for optimizing transformations. By including only the generated ADF, the generated ADF's neighbors, and those stored ADFs which share transformations with the ADF's neighbors, any transformation errors generated by the co-optimization problem will not propagate to transformations between other ADFs. The undirected graph of optimized merged ADFs can be fed to an application executing at the electronic device 100 to enable augmented reality or other location-based functionality by allowing the electronic device 100 to more efficiently and accurately recognize a local environment 112 that it has previously traversed.

Figure 2:
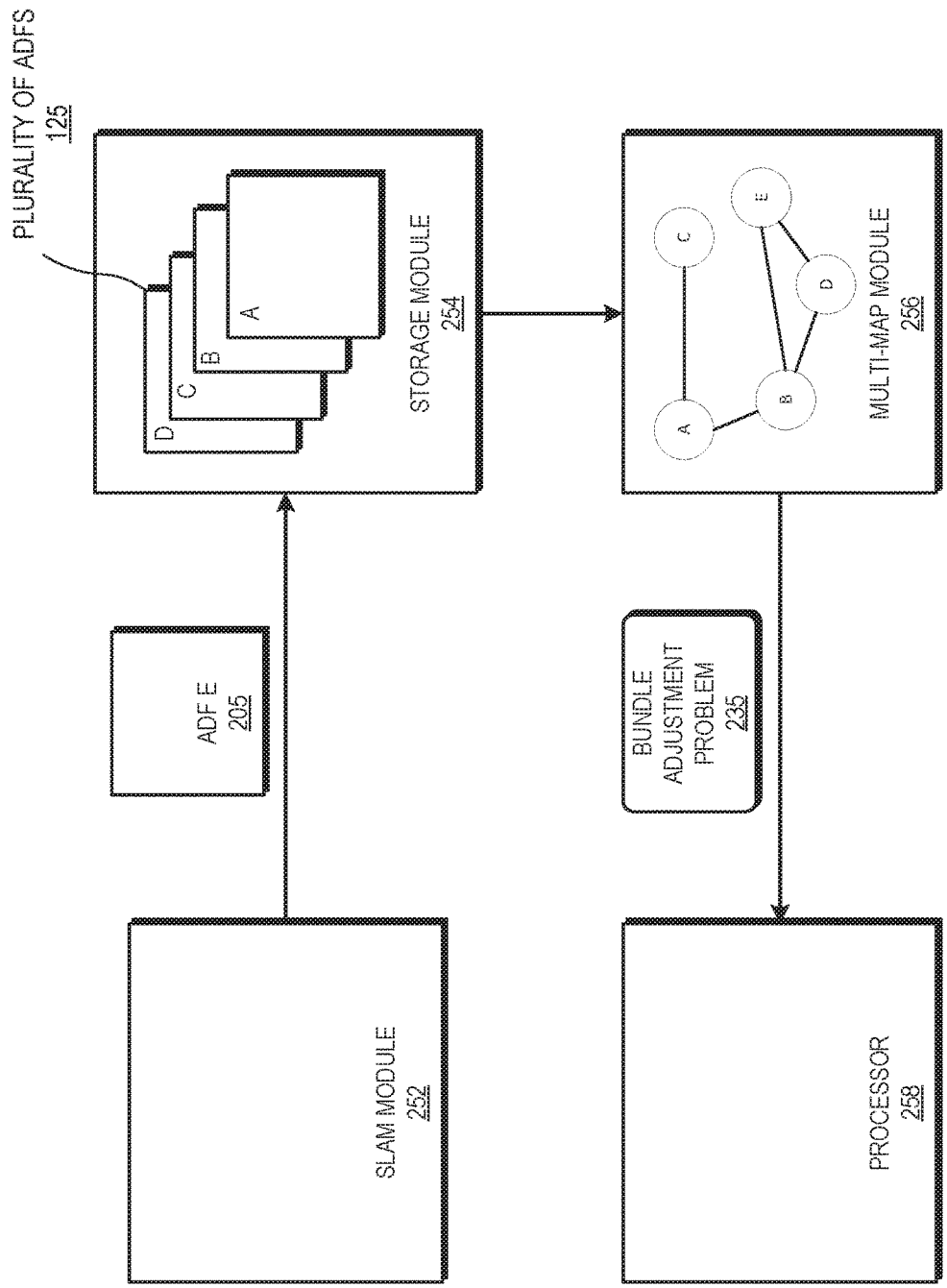
FIG. 2 is a diagram illustrating a map merger of the electronic device of FIG. 1 configured to represent generated and stored ADFs as vertices in an undirected graph and to represent transformations between ADFs as edges in the undirected graph in accordance with at least one embodiment of the present disclosure.

FIG. 2 is a block diagram of the components of a map merger 250 of the electronic device 100 of FIG. 1. The map merger 250 includes a simultaneous localization and mapping module (SLAM) 252, a storage module 254, a multi-map module 256, and a processor 258. The map merger 250 merges stored ADFs sharing a threshold amount of descriptors to one another, and merges generated ADFs to a plurality of stored ADFs. To facilitate the merger of ADFs and to more accurately represent the relations between any two ADFs, the map merger 250 represents each ADF as a vertex in an undirected graph and represents transformations between ADFs in the undirected graph as edges connecting the vertices.

The SLAM module 252 is configured to receive visual sensor data 136 from the imaging camera 114, depth data 138 from the depth sensor 120, and inertial sensor data 142 from the non-image sensors (not shown) of FIG. 1. The SLAM module 252 generates an ADF from the received sensor data and compares the geometric data for the generated ADF to geometric data of a plurality of stored ADFs stored at the memory 254. The SLAM module 252 computes a transformation, if possible, to any ADFs stored at the memory 254 having matching geometric data. The transformation can transform geometric data associated with the generated ADF to be aligned with geometric data of any of the stored ADFs having matching geometric data by positioning and rotating the geometric data associated with the generated ADF.

The memory 254 is a memory configured to store a plurality of ADFs and transformations between ADFs. Each ADF generated by the SLAM module 252 is transferred to the memory 254 for storage. The memory 254 can include any one or more computer-readable media, including, but not limited to, non-transitory computer-readable media, RAM, ROM, hard drives, flash drives, or other memory devices.

The multi-map module 256 is configured to represent the generated and stored ADFs as vertices in an undirected graph and to represent the transformations between ADFs as edges connecting the vertices in the undirected graph. If a generated ADF has a transformation to a stored ADF from the SLAM module 252, the generated ADF is added to the undirected graph of stored ADFs as a vertex, and the transformation between the generated ADF and the stored ADF(s) is added to the undirected graph as an edge. If a transformation for the generated ADF is not available from the SLAM module 252, the multi-map module searches the stored ADFs to determine whether there are sufficient matching descriptors between the generated ADF and one or more stored ADFs to compute a transformation. If there are sufficient matching descriptors to compute a transformation, the multi-map module 256 computes the transformation and adds the generated ADF to the undirected map as a vertex and adds the computed transformation to the undirected graph as an edge connecting the vertex of the generated ADF to the vertex of the one or more ADFs with which a transformation was computed.

The processor 258 comprises one or more central processing units (CPUs), graphics processing units (GPUs), or a combination of one or more CPUs and one or more GPUs. The Snapdragon™ 810 MSM8994 system-on-a-chip (SoC) from Qualcomm Incorporated is an example of a commercially-available implementation of the processor 258. In operation, the processor 258 executes a VR/AR application (not shown) to provide VR/AR functionality for a user. As part of this process, the VR/AR application (not shown) manipulates the processor 258 to render a sequence of VR images for display at the display 108 of the electronic device 100 of FIG. 1, with the sequence of images representing a VR/AR scene.

In operation, the SLAM module 252 generates an ADF E 205 from visual sensor data 136 and inertial sensor data 142 of FIG. 1. The SLAM module 252 may also compute a transformation (not shown) between ADF E 205 and one or more ADFs stored at the storage module 254. The SLAM module 252 sends the ADF E 205 and its associated transformation, if any, to the memory 254. The memory 254 stores a plurality of ADFs A, B, C, D 254 and their respective transformations. Multi-map module 256 represents the plurality of ADFs A, B, C, D 254 and generated ADF E 205 as vertices in an undirected graph and the transformations between ADFs as edges in the undirected graph. In the example depicted in FIG. 2, ADFs A and B share a transformation and ADFs A and C share a transformation. In addition, ADFs D and E share a transformation with each other and with ADF B, but not with ADFs A or C. Once all possible transformations between ADFs have been computed, the multi-map module sends the undirected graph as a co-optimization problem 235 to the processor 258. The processor 258 solves the co-optimization problem 235, optimizing only the transformations directly between the generated ADF E 205 and stored ADFs A, B and D. In this way, the transformation between ADFs A and C remains unchanged from the optimization of the transformations between ADFs B, D, and E.

Figure 3:
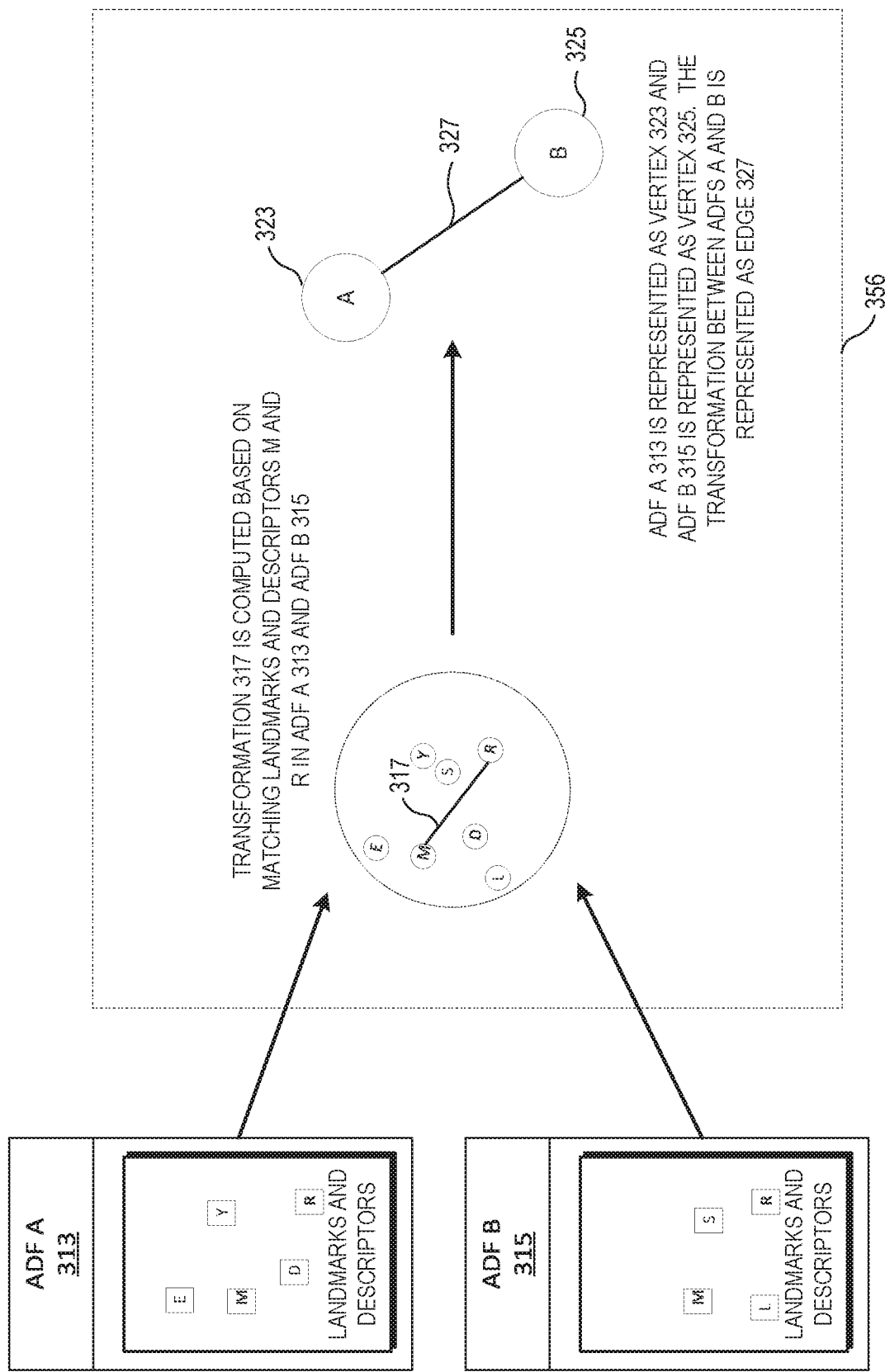
FIG. 3 is a diagram illustrating a transformation computed between two stored ADFs and a representation of the ADFs and the transformation as vertices and an edge, respectively, in an undirected graph in accordance with at least one embodiment of the present disclosure.

FIG. 3 is a diagram illustrating a transformation computed between two stored ADFs A 303 and B 305 having matching descriptors, and a representation of the two stored ADFs as vertices in an undirected graph and the transformation as an edge in the undirected graph, in accordance with some embodiments of the present disclosure. ADF A 303 includes descriptors E, Y, M, D, and R corresponding to geometric data associated with spatial features measured by visual and inertial sensors. ADF B 305 includes descriptors M, S, L, and R, corresponding to geometric data associated with spatial features measured by visual and inertial sensors. A multi-map module 356 computes a transformation 307 based on matching descriptors M and R in ADF A 303 and ADF B 305. The multi-map module 356 then represents ADF A 303 as vertex 313 and ADF B as vertex 315 in an undirected graph, and represents the transformation 307 as edge 317 in the undirected graph.

Figure 4:
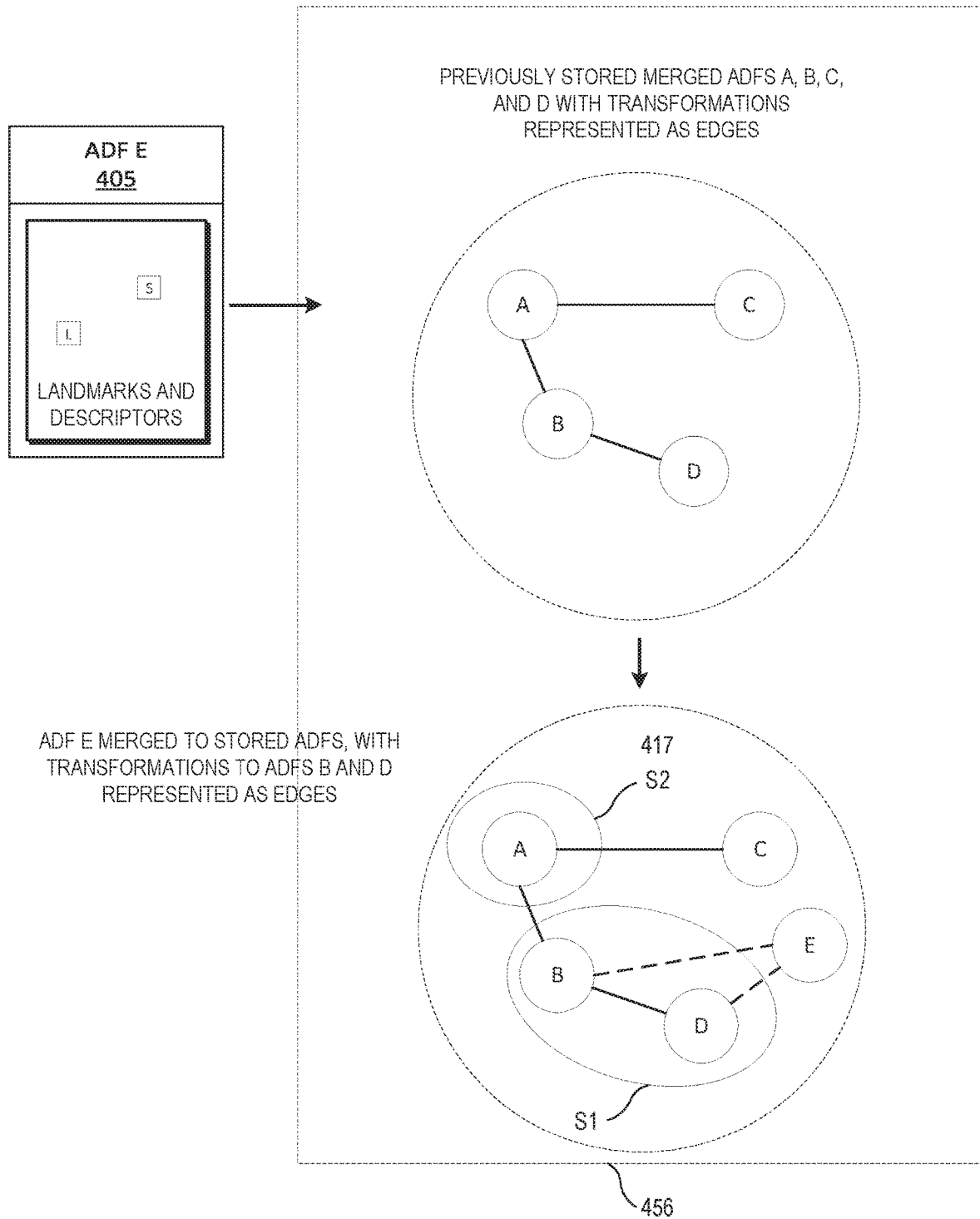
FIG. 4 is a diagram illustrating a merger of a generated ADF to a set of stored ADFs by adding the generated ADF as a vertex to an undirected graph and adding transformations between the generated ADF and one of the stored ADFs as edges in the undirected graph in accordance with at least one embodiment of the present disclosure.

FIG. 4 is a diagram illustrating a multi-map module 456 merging a generated ADF E 405 to a collection of previously stored merged ADFs A, B, C, and D in accordance with at least one embodiment of the present disclosure. ADF E 405 includes descriptors L and S, which are shared with at least ADF B 315 of FIG. 3. Previously stored ADFs A, B, C, and D have been represented as vertices in an undirected graph, with transformations between ADFs A and C, A and B, and B and D represented as edges. The edges connecting ADFs A, B, C, and D indicate that transformations between those ADFs can be computed directly from their mutual descriptors. The multi-map module 456 computes a transformation between ADF E 405 and ADF B 315 based on shared descriptors L and S. In some embodiments, the SLAM module 252 additionally provides a transformation between ADF E 405 and ADF D. The multi-map module 456 adds ADF E 405 as a vertex to the undirected graph 417 and adds the transformations between ADF E 405 and ADFs B and D as edges in the undirected graph. As depicted in the undirected graph 417, the ADFs in set S1 (ADFs B and D) have direct transformations with the generated ADF E, and the ADF in set S2 (ADF A) has a path to connect (i.e., a direct transformation) with the ADFs in set S1.

Figure 5:
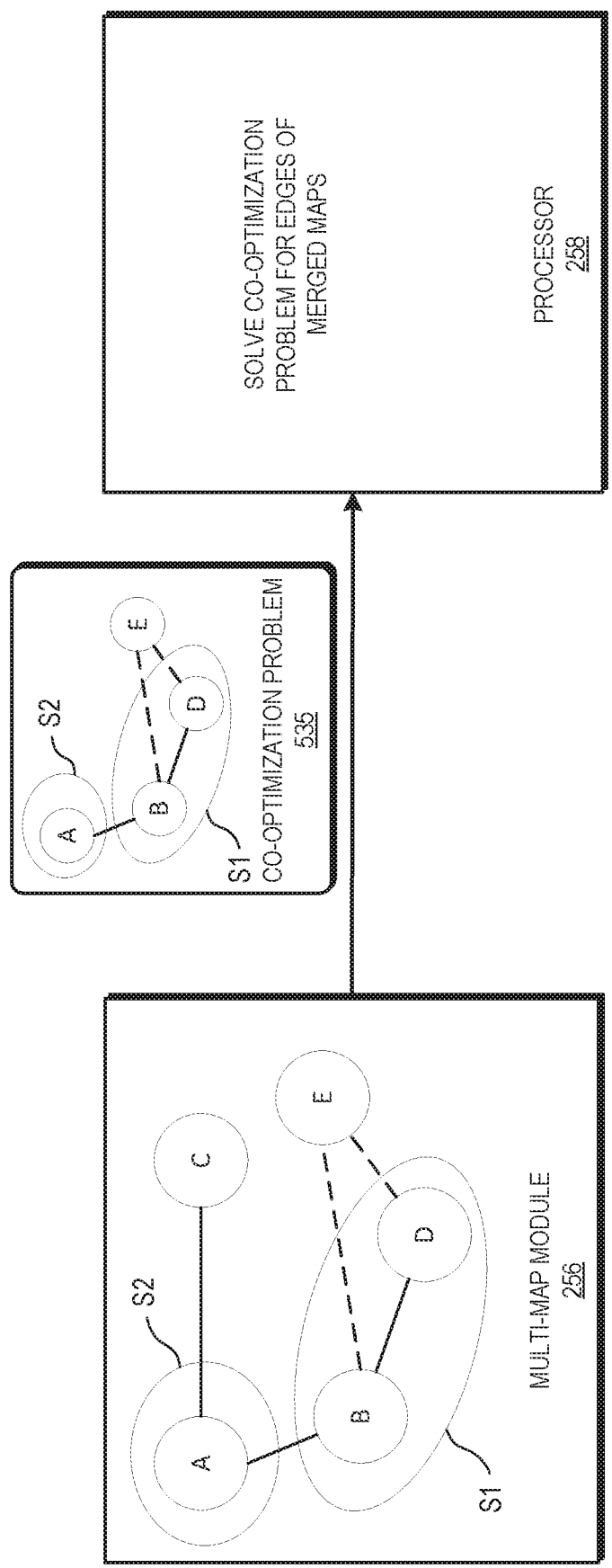
FIG. 5 is a diagram illustrating a co-optimization problem based on the edges directly shared between the vertex of an added ADF and the vertices of a collection of stored ADFs in accordance with at least one embodiment of the present disclosure.

FIG. 5 illustrates a simplified co-optimization problem based on the edges directly shared between the vertex of a generated ADF E and the vertices of a collection of previously stored ADFs A, B, and D in accordance with at least one embodiment of the present disclosure. The multi-map module 256 of FIG. 2 represents merged ADFs A, B, C, D, and E as vertices in an undirected graph and represents the transformations computed from directly shared descriptors between ADFs as edges connecting the vertices in the undirected graph. In the example of FIG. 5, existing edges (shown in solid lines) connect ADFs A and B, A and C, and B and D, and newly-added edges (shown in dashed lines) connect ADF E to ADFs B and D. Set S1 includes those ADFs that have direct transformations with ADF E (i.e., ADFs B and D), and set S2 includes those ADFs that have direct transformations with the ADFs in set S1 (i.e., ADF A). The co-optimization problem 535 that is sent to the processor 258 of FIG. 2 by the multi-map module 256 includes only ADFs in sets S1 and S2 (ADFs A, B, D, and E) and their mutual transformations. The processor 258 solves the co-optimization problem to minimize reprojection errors between image locations of observed and predicted spatial features, which is expressed as the sum of squares of a large number of nonlinear, real-valued functions. The minimization is achieved using nonlinear least-squares algorithms. By solving the co-optimization problem for only the newly-added vertex and its edges, the processor can more efficiently optimize the transformations for the newly added ADF E and avoid accumulating errors or introducing inconsistent errors into the existing transformation between ADFs A and C. In some embodiments, the multi-map module sends a co-optimization problem including all merged ADFs to the processor to compute a final optimization.

Figure 6:
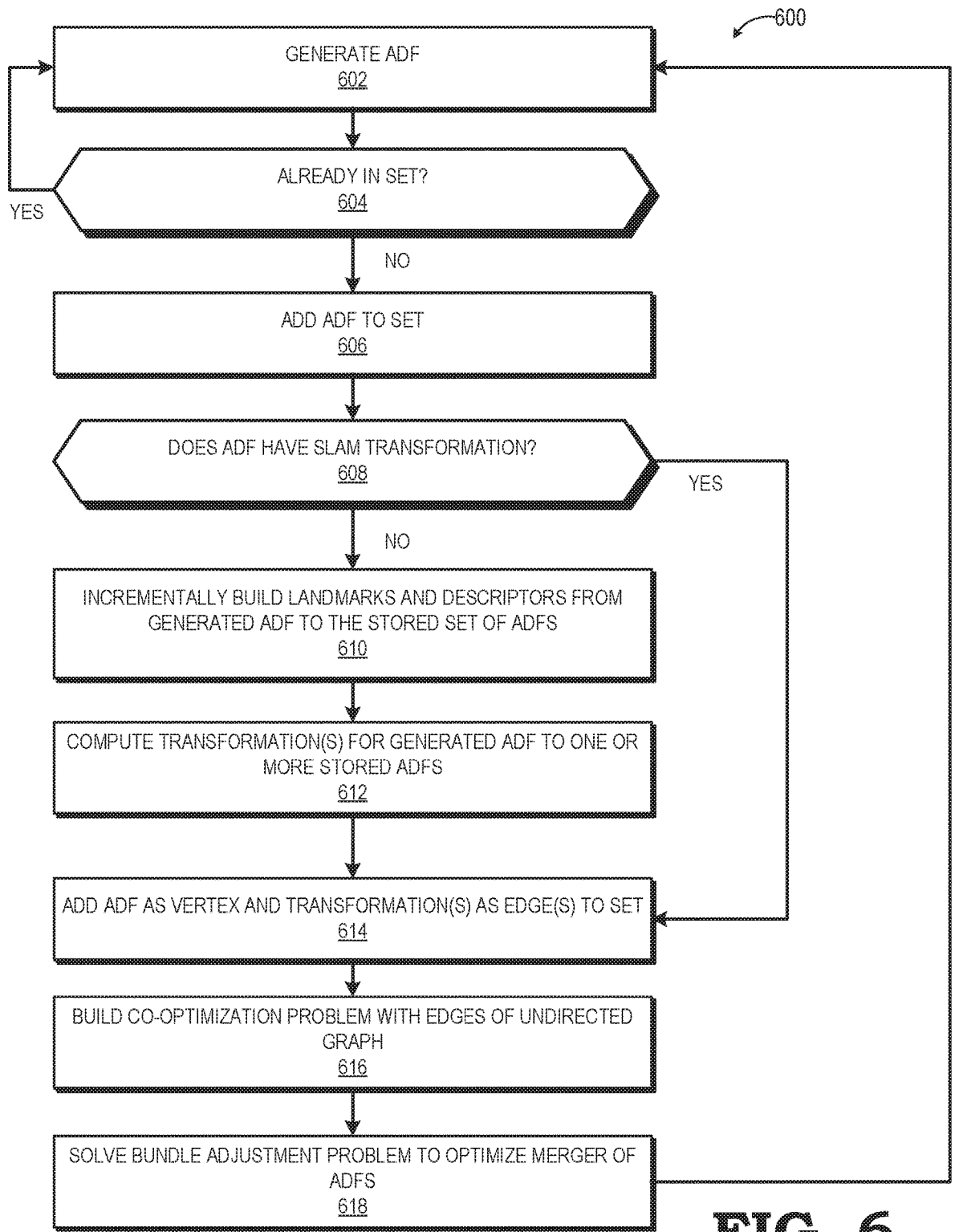
FIG. 6 is a flow diagram illustrating operation of an electronic device to represent generated ADF and stored ADFs as vertices in an undirected graph and transformations between ADFs as edges in the undirected graph in accordance with at least one embodiment of the present disclosure.

FIG. 6 illustrates a method 600 of representing generated ADFs and stored ADFs as vertices in an undirected graph and transformations between ADFs as edges in the undirected graph in accordance with at least one embodiment of the present disclosure. For purposes of description, the method 600 is described with respect to an example implementation at the electronic device 100 of FIGS. 1-5. At block 602, in response to a reset or other initialization event, the electronic device 100 generates an ADF of the local environment 112. At block 604, the map merger 150 determines if the generated ADF is already stored in a set of previously generated ADFs at the memory 254. If the generated ADF is already stored at the memory 254, the process flow returns to block 602. If the generated ADF is not already stored at the memory 254, the process flow proceeds to block 606, at which the generated ADF is added to the set of ADFs stored at the memory 254. At block 608, the multi-map module 256 queries the SLAM module 252 to determine whether the SLAM module 252 has computed a transformation for the generated ADF. If the SLAM module 252 has computed a transformation for the generated ADF, the process flow continues to block 614. If the SLAM module 252 has not computed a transformation for the generated ADF, the process flow continues to block 610.

At block 610, the multi-map module 256 incrementally compares the descriptors of the generated ADF to the descriptors of the stored set of previously generated ADFs to determine if there are sufficient matching descriptors to compute a transformation. If there are sufficient matching descriptors, the process flow continues to block 612, at which the multi-map module 356 computes a transformation for the generated ADF, aligning its descriptors with the matching descriptors of one or more of the previously generated ADFs stored at the memory 254. At block 614, the multi-map module 256 adds the generated ADF as a vertex to an undirected graph in which the previously generated ADFs are represented as vertices and transformations between the previously generated ADFs are represented as edges connecting the vertices. The multi-map module 256 further adds an edge (or edges) connecting the vertex of the generated ADF to the previously generated ADF(s) with which the generated ADF shares a transformation.

At block 616, the multi-map module 256 builds a co-optimization problem including the vertex and edge(s) of the generated ADF and the vertices of any previously generated ADFs with which the generated ADF shares a transformation. At block 618, the processor 258 solves the co-optimization problem, optimizing the transformations between the generated ADF and the previously generated ADFs.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
representing each map of a plurality of stored maps representing an environment of an electronic device as a vertex in an undirected graph, wherein each of the stored maps comprises descriptors of one or more visual landmarks based in part on measurements by visual and inertial sensors of a physical or virtual scene;
representing transformations between maps of the plurality of stored maps as edges in the undirected graph, wherein a transformation aligns geometric data of maps sharing descriptors;
receiving a first received map comprising descriptors generated based in part on measurements by visual and inertial sensors;
merging the first received map to at least one map of the plurality of stored maps in response to determining that a first transformation can be computed from descriptors shared between the first received map and the at least one map, wherein merging comprises representing the first received map as a vertex and representing the first transformation as a first edge in the undirected graph;

refining the transformations between maps by solving a co-optimization algorithm that includes only the first received map, the at least one map and those maps which share transformations with the at least one map; and generating a display for location-based functionality based on the merged maps.

2. The method of claim 1, wherein determining that a first transformation can be computed from descriptors shared between the first received map and the at least one map comprises receiving a transformation from the visual and inertial sensors.

3. The method of claim 1, wherein determining that a first transformation can be computed from descriptors shared between the first received map and the at least one map comprises matching one or more descriptors of the first received map to one or more descriptors of the at least one map.

4. The method of claim 1, wherein the first received map is received following a reset of the visual and inertial sensors.

5. The method of claim 1, further comprising:
determining whether the first received map is already stored in the plurality of stored maps; and wherein
merging the first received map to the at least one map of the plurality of stored maps is in response to determining that the first received map is not already stored in the plurality of stored maps.

6. A method comprising:
storing a plurality of maps representing an environment of an electronic device, the maps comprising descriptors of one or more visual landmarks based in part on measurements of images captured by visual and inertial sensors;
representing the maps as vertices in an undirected graph;
merging a first received map comprising descriptors generated based in part on measurements by visual and inertial sensors and a second map of the plurality of maps in response to determining that a transformation aligning geometric data of the first received map and the second map can be computed from descriptors shared between the first received map and the second map, wherein merging comprises representing the transformation as a first edge connecting the vertices of the first received map and the second map in the undirected graph;
refining the transformation between the first received map and the second map by solving a co-optimization algorithm that includes only the first received map, the second map and those maps of the plurality of maps which share transformations with the second map; and
generating a display for location-based functionality based on the merged maps.

7. The method of claim 6, wherein determining that a transformation can be computed from descriptors shared between the first received map and the second map comprises receiving a transformation between the first received map and the second map from the visual and inertial sensors.

8. The method of claim 6, wherein determining that a transformation can be computed from descriptors shared between the first received map and the second map comprises matching one or more descriptors of the first received map to one or more descriptors of the second map.

9. The method of claim 6, further comprising:
receiving a third map comprising descriptors generated based in part on measurements from visual and inertial sensors;
representing the third map as a vertex in the undirected graph; and
merging the third map to at least one map of the plurality of maps in response to determining that a transformation can be computed from descriptors shared between the third map and the at least one map, wherein merging comprises representing the transformation between the third map and the at least one map as a second edge connecting the vertex of the third map to the vertex of the at least one map in the undirected graph.

10. The method of claim 9, wherein determining that a transformation can be computed from descriptors shared between the third map and the at least one map comprises receiving a transformation between the third map and the at least one map from the visual and inertial sensors.

11. The method of claim 9, wherein determining that a transformation can be computed from descriptors shared between the third map and the at least one map comprises matching one or more descriptors of the third map to one or more descriptors of the at least one map.

12. The method of claim 9, wherein the third map is received following a reset of the visual and inertial sensors.

13. The method of claim 9, wherein the third map is received from a source other than the visual and inertial sensors.

14. The method of claim 6, further comprising:
determining whether the first received map is already stored in the plurality of maps; and wherein
merging the first received map and the second map of the plurality of maps is in response to determining that the first received map is not already stored in the plurality of maps.

15. A device comprising:
a memory configured to store a plurality of maps comprising data representations of physical or virtual scene, wherein each map comprises descriptors of one or more visual landmarks based in part on measurements of images captured by visual and inertial sensors;
a multi-map module configured to represent the maps as vertices in an undirected graph and transformations aligning geometric data between two or more maps as edges in the undirected graph, wherein the multi-map module is further configured to merge a first received map to at least one map of the plurality of maps in response to determining that a transformation can be computed from descriptors shared between the first received map and the at least one map, and wherein merging comprises representing the first received map as a vertex and the transformation that can be computed from descriptors shared between the first received map and the at least one map as a first edge in the undirected graph;
a processor configured to refine the transformation between the first received map and the at least one map by solving a co-optimization problem that includes only the first received map, the at least one map and those maps of the plurality of maps which share transformations with the at least one map; and
a display for displaying location-based functionality based on the merged maps.

16. The device of claim 15, wherein the multi-map module is further configured to determine that a transformation can be computed from descriptors shared between the first received map and the at least one map in response to receiving a transformation between the first received map and the at least one map from the visual and inertial sensors.

17. The device of claim 15, wherein the multi-map module is further configured to determine that a transformation can be computed from descriptors shared between the first received map and the at least one map in response to matching one or more descriptors of the first received map to one or more descriptors of the at least one map.

18. The device of claim 15, wherein the first received map is received following a reset of the visual and inertial sensors.

19. The device of claim 15, wherein the first received map is received from a source other than the visual and inertial sensors.

20. The device of claim 15, wherein the multi-map module is further configured to merge a first received map to at least one map of the plurality of maps in response to determining that the first received map is not already stored in the plurality of maps.

\* \* \* \* \*